(12) United States Patent
Vijayant et al.

(10) Patent No.: US 10,373,046 B2
(45) Date of Patent: Aug. 6, 2019

(54) CLIENT-SERVER HYBRID AI SCORES FOR CUSTOMIZED ACTIONS

(71) Applicant: salesforce.com, inc., San Francisco, CA (US)

(72) Inventors: Amit Vijayant, Belmont, CA (US); Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 176 days.

(21) Appl. No.: 15/400,331

(22) Filed: Jan. 6, 2017

(65) Prior Publication Data

US 2018/0198889 A1 Jul. 12, 2018

(51) Int. Cl.
*G06N 3/00* (2006.01)
*H04L 29/08* (2006.01)

(52) U.S. Cl.
CPC .......... *G06N 3/004* (2013.01); *H04L 67/306* (2013.01); *H04L 67/02* (2013.01); *H04L 67/22* (2013.01)

(58) Field of Classification Search
CPC ......... G06N 3/004; H04L 67/22; H04L 67/42; H04L 67/02; H04L 67/306
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

U.S. Appl. No. 13/986,251, filed Apr. 16, 2013.

*Primary Examiner* — Gil H. Lee
(74) *Attorney, Agent, or Firm* — Dergosits & Noah LLP; Todd A. Noah (57) ABSTRACT

Client-server hybrid A.I. scores for customized actions are described. A client generates client scores corresponding to client customized actions by applying a user-specific model to an action received from a user, the user-specific model based on at least one historical action received from the user. The client requests a server to provide server scores corresponding to server customized actions by applying a cross-user model to the action received from the user, the cross-user model based on historical actions associated with server users. The client generates hybrid scores corresponding to hybrid customized actions by combining the client scores with the server scores, in response to receiving the server scores from the server. The client causes the hybrid customized actions to be outputted based on the corresponding hybrid scores.

17 Claims, 3 Drawing Sheets

(56) References Cited

U.S. PATENT DOCUMENTS

| | | | |
|---|---|---|---|
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 7,983,926 B2 * | 7/2011 | Adjali | G06Q 10/06375 |
| | | | 705/1.1 |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,335,719 B1 * | 12/2012 | Quraishi | G06Q 30/0241 |
| | | | 705/14.49 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,776,168 B1 * | 7/2014 | Gibson | H04L 63/104 |
| | | | 709/225 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0144440 A1 * | 6/2010 | Arrasvuori | A63F 13/12 |
| | | | 463/42 |
| 2011/0106835 A1 * | 5/2011 | Lauridsen | G06F 17/3089 |
| | | | 707/769 |
| 2012/0117017 A1 * | 5/2012 | Phillips | H04N 21/44204 |
| | | | 706/50 |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0254152 A1 * | 9/2013 | Zhang | G06Q 30/0201 |
| | | | 706/52 |
| 2014/0025609 A1 * | 1/2014 | Coster | G06Q 30/0631 |
| | | | 706/12 |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |
| 2017/0323268 A1 * | 11/2017 | Zhang | G06F 17/3053 |

\* cited by examiner

CLIENT-SERVER HYBRID AI SCORES FOR CUSTOMIZED ACTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A client-server model is a computing model which divides tasks between the providers of a resource or service, called servers, and resource or service requesters, called clients. Clients and servers communicate over a computer network. Clients initiate communication sessions with servers which await incoming requests. Functions such as email exchange, web access, and database access are typically built on the client-server model.

Data science applications are almost always executed by servers. When artificial intelligence (A.I.) models are applied to an action that a user takes on a client, such as to provide a recommendation or personalization, the flow is almost always the following: After a user of a client performs an action, a server identifies the user action, applies a pre-computed machine learning model to the user action, and provides the model's result synchronously or asynchronously to the user. Whereas this flow is unavoidable for complex data science applications, in a relatively lighter implementation on websites, the application of models can be executed on clients themselves, thereby freeing up server resources. In an example of a client-delegated intelligence approach for a website, a server creates models and encapsulates the models in resources, and clients download those resources when visiting the relevant servers' websites. As a user of a client performs actions and interacts with the website in the client's session, the client passes the session state through the downloaded model, thereby triggering the desired action for the user, with all of the model's logic executing entirely in the user's client.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

In data science applications such as machine-learned search ranking, ad placement, and recommendation engines, the machine learning model can generate more accurate results by modeling both user features and server content features. Such a model scores server content high for a particular user if the server content's features match the user's features, such as the user profile, the user search history, and various other interactions, not only with the current server's website, but also with other servers' websites. Modeling the user features on the client is advantageous because the user features are available on the client, thereby facilitating real-time model training, and also making it easier to model almost any interaction the user has, not just those with a particular server's web site, such that any client can in effect become a modeling server for that client's user. On the other hand, servers creating user models would require clients to frequently send their user's data to the servers, and would require the servers to host and manage user models for all users, which may number in the millions. In applications where cross-user learning is important, or where models need to be trained on the combination of user data and content data, server-side training is more advantageous.

Methods and mechanisms for client-server hybrid A.I. scores for customized actions will be described with reference to example embodiments. The following detailed description will first describe a method for client-server hybrid A.I. scores for customized actions. Next, an example system for client-server hybrid A.I. scores for customized actions is described.

In accordance with embodiments described herein, there are provided methods and systems for client-server hybrid A.I. scores for customized actions. A client generates client scores corresponding to client customized actions by applying a user-specific model to an action received from a user, the user-specific model based on at least one historical action received from the user. The client requests a server to provide server scores corresponding to server customized actions by applying a cross-user model to the same action received from the user, the cross-user model based on historical actions associated with other users. The client generates hybrid scores corresponding to hybrid customized actions by combining the client scores with the server scores received from the server. The client causes the hybrid customized actions to be outputted based on the corresponding hybrid scores.

For example, when Joe uses his smartphone to view the televisions4u.com website, his smartphone uses a user-specific model that projects trends in Joe's viewing history to generate scores of 70 for viewing television X information, 20 for viewing television Y information, and 10 for viewing television Z information. The smartphone requests the website's server to use a cross-user model that projects trends in the website users' viewing and purchasing histories to provide scores, which generates scores of 15 for viewing television X information, 30 for viewing television Y information, and 55 for viewing television Z information. The smartphone receives the website server's scores, and combines the scores based on Joe's history with the scores based on the website users' histories to generate the hybrid scores of 85 for viewing television X information, 50 for viewing television Y information, and 65 for viewing television Z information. The smartphone outputs televisions4u.com's webpage to Joe, displaying television X information prominently at the top due to its highest hybrid score of 85, followed by television Z information due to its hybrid score of 65, with a scroll down required to view television Y information due to its lowest hybrid score of 50. The smartphone displayed television X information prominently at the top of the webpage due to the scores based on Joe's history, which were not available to the website's server because Joe was a first time visitor to the website, but did not display television Y information next because of the scores based on the website users' histories. Furthermore, Joe's preferences may differ from the aggregate preferences across other users, such that while television Z information may fit the cross-user model better, television X information may fit Joe's unusual preferences much better Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
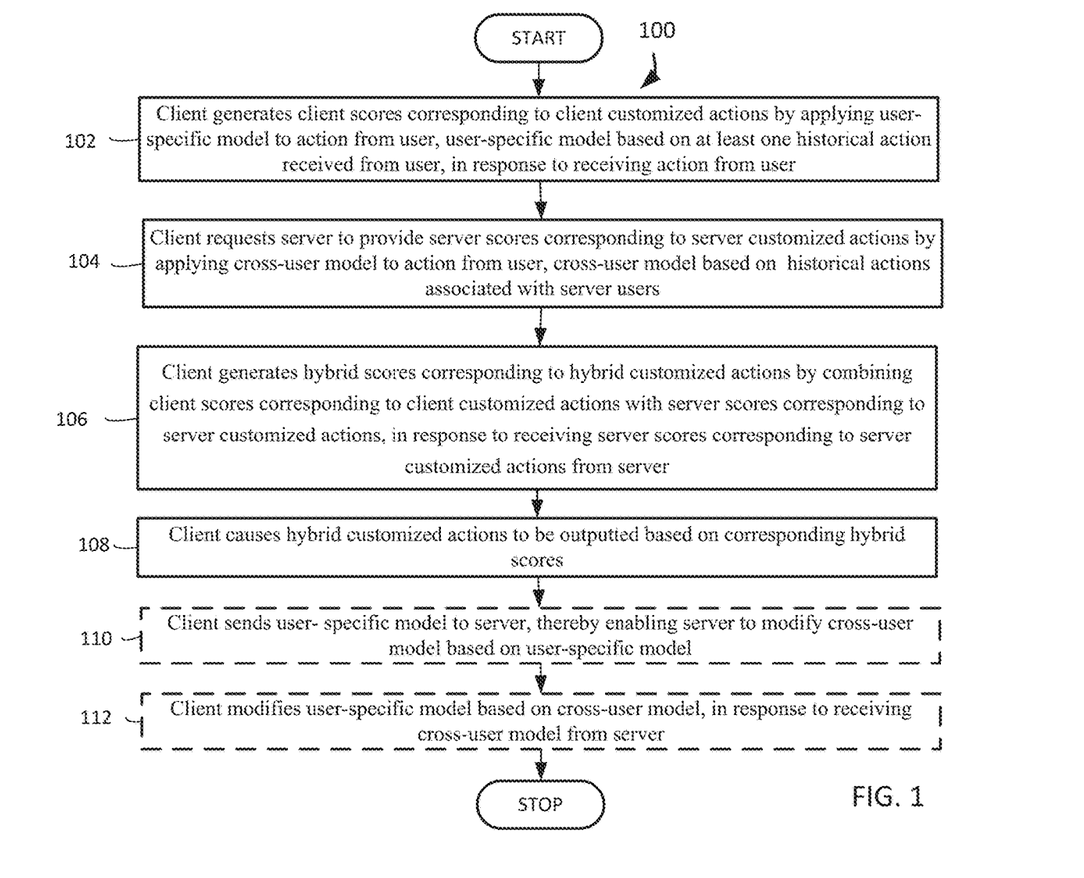
FIG. 1 is an operational flow diagram illustrating a high level overview of a method for client-server hybrid A.I. scores for customized actions, in an embodiment.
Figure 2:
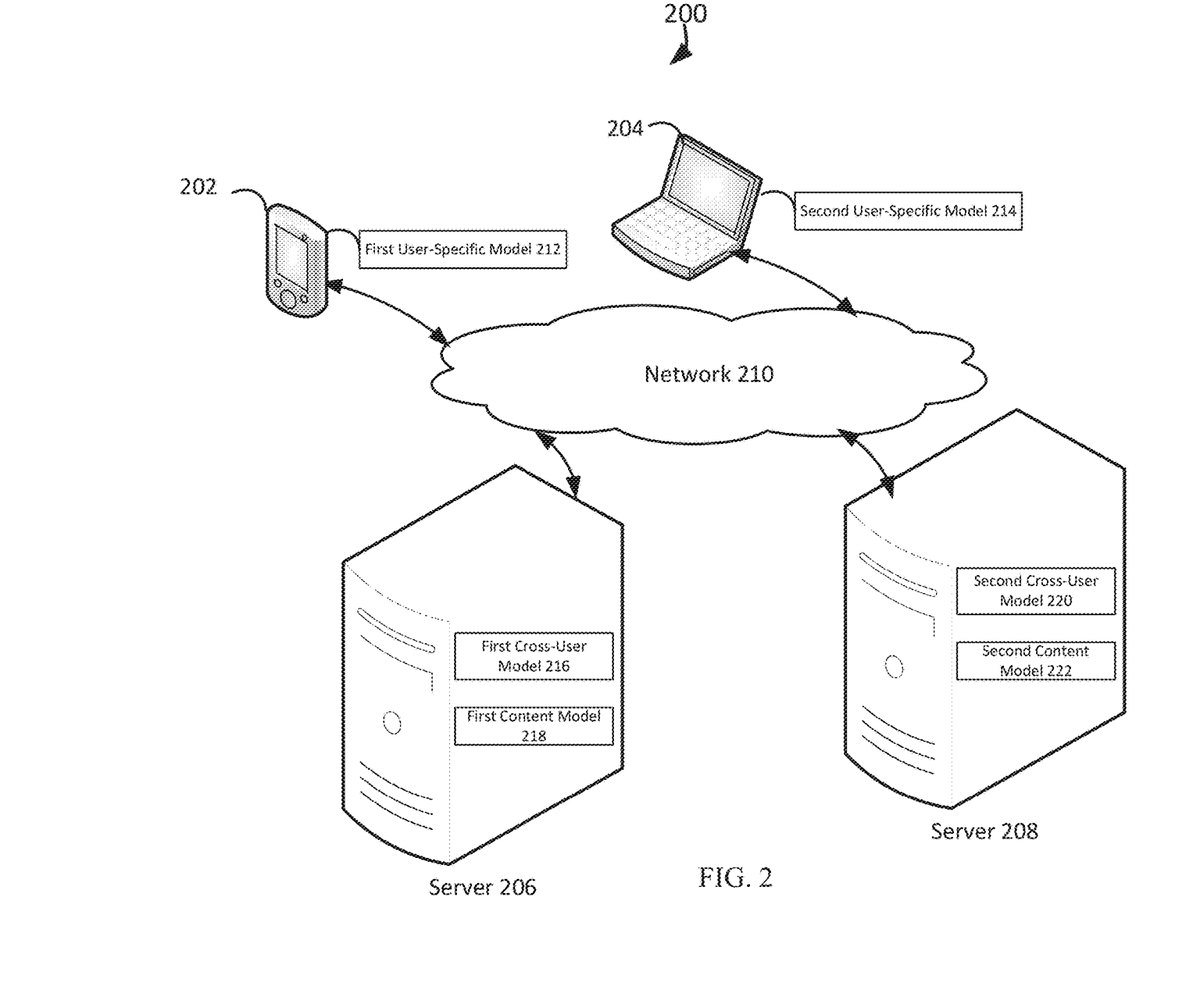
FIG. 2 depicts an example system for client-server hybrid A.I. scores for customized actions, in an embodiment.

FIG. 1 is an operational flow diagram illustrating a high level overview of a method 100 for client-server hybrid A.I. scores for customized actions. The example of a system 200 and its components 202-222 which are mentioned below in reference to FIG. 1 are depicted in FIG. 2 and described below in reference to FIG. 2.

Once a client receives an action from a user, the client generates client scores corresponding to client customized actions by applying a user-specific model to the action received from the user, the user-specific model based on at least one historical action received from the user, block 102. The client bases client-server hybrid customized actions on scores generated by the client's application of a user-specific model to a user action. For example and without limitation, this can include the smartphone 202 using the first user-specific model 212 that projects trends in user Joe's viewing history to generate scores of 70 for viewing television X information, 20 for viewing television Y information, and 10 for viewing television Z information, in response to Joe using his smartphone 202 to view the televisions4u.com website. The user-specific model may be based on user actions that requested services or resources from different servers. For example, the smartphone 202 uses the first user-specific model 212 based on Joe's history of using search engines to search for television information, Joe's history of viewing television information at the televisions4u.com website via the first server 206, and/or Joe's history of viewing television information at the TVs-Rus.com website via another server that is not depicted in FIG. 2. The user-specific model may generate scores based on projected trends in user actions. For example, even though Joe has viewed television Y information and television Z information on an equal number of occasions in the past, the first user-specific model 212 generates scores of 20 for viewing television Y information, and 10 for viewing television Z information due to trends in Joe's actions. Recently Joe has been viewing television Y information more frequently than he has been viewing television Z information, progressively increasing the time spent when viewing television Y information on each occasion that Joe views television Y information, and progressively decreasing the time spent when viewing television Z information on each occasion that Joe views television Z information.

An action can be a behavior, such as when a user operates a client to request a service or a resource from a server. There may be two different types of actions: a stand-alone action and an action on an object. An example of a stand-alone action includes a search query, in which the content of the action is the content of the search query, such as text and any selected filters. Examples of an action on an object include clicking on content, liking content, disliking content, and viewing content. Some of these actions on an object may have additional attributes, such as the action of viewing content may have "time viewed" and "duration." Learning models from stand-alone actions is potentially simpler, often only modeling frequencies with which various attributes in the actions are done, by the user for the user-specific model and across all users for the cross-user model. Learning models from actions on objects is more involved, but also potentially more accurate. An action on an object may be viewed as a positive (such as click, like, or view) or a negative (such as dislike), and different actions can have different strengths (such as like having a higher strength than click). The system learns correlations between suitable features of an object and a corresponding action, which requires modeling of features of content, which can vary by content type, such as web page→title, keywords, and phrases in the body . . . image→text in caption, and actual pixels in image. So the system uses training items of the form features (object), action type (positive or negative), and action strength to learn correlations between features and action type and action strength.

A client can be a part of computer hardware or software that accesses a service or resource made available by a server, such as part of a desktop computer, a wearable computer, a dual mode handset, a dual Subscriber Identification Module (SIM) phone, a wireless mobile device, a pager, a personal digital assistant (PDA), a portable computer, a tablet computer, a laptop computer, a digital camera, a digital music player, a digital calculator, or an electronic key fob for keyless entry. A user can be a person who operates a computer such as a client. A historical action can be behavior that occurred in the past, such a previous occasion when a user operated a client to request a service or a resource from a server. A user-specific model can be learned knowledge that enables prediction of behavior by a person operating a computer, such as a client, based on previous behavior by the person. A client customized action can be a behavior, which is modified by the hardware and/or software that is requesting a service or resource, in order to suit the person who is using the hardware and/or software to request the service or resource. A client score can be a rating or grade that is generated by the hardware and/or software that is requesting a service or resource.

After receiving the action from the user, the client requests a server to provide server scores corresponding to server customized actions by applying a cross-user model to the action received from the user, the cross-user model based on historical actions associated with all users, block 104. The client bases client-server hybrid customized actions on scores generated by the server's application of a cross-user model to a user action. By way of example and without limitation, this can include the smartphone 202 requesting the televisons4u.com website's server 206 to use the first cross-user model 216 that projects trends in the website users' viewing and purchasing histories to provide scores, which generates scores of 15 for viewing television X information, 30 for viewing television Y information, and 55 for viewing television Z information. Although these examples describe the server applying the cross-user model to the user action to generate server scores after the client has applied the user-specific model to the user action to generate client scores, the sever can generate server scores before the client generates client scores or simultaneously with the client generating client scores. If the server has recently provided the cross-user model to the client, when the client requests the server to provide server scores corresponding to server customized actions by applying the cross-user model to the action from the user, the client can apply the cross-user model, which the client received from the server, to the action received from the user.

Requesting the server to provide the server scores corresponding to the server customized actions may include providing the server with data associated with the user. For example, the smartphone 202 provides the first server 206 with data about Joe. The data about Joe can range anywhere from a minimal amount of user data, such as the request to view the website televisions4u.com originated from the United States of America, to a significant amount of user data, such as Joe is a 39 year old male professional who lives in San Francisco, Calif., who has viewed information about televisions X, Y, and Z when visiting the TVsRus.com website, and who has indicated that he likes television X on a specific social network. This user data enables the server to base the server scores on the data in the cross-user model that corresponds to the user data provided by the client. For example, the first server 206 applies the first cross-user model 216 to data for users who reside in the United States of America. In another example, the first server 206 applies the first cross-user model 216 to data for users who in San Francisco, Calif., who have viewed information about televisions X, Y, and/or Z when visiting any website, and who have indicated a preference for televisions X, Y, and/or Z on any social network.

The server scores corresponding to the server customized actions may be further based on applying a content model to the action from the user, the content model based on data associated with server content. For example, the televisions4u.com website's server 206 also uses the first server content model 218 that projects trends in the website users' viewing and purchasing histories of specific server content to provide scores, which generates scores of 25 for viewing television X information, 25 for viewing television Y information, 25 for viewing television Z information, and 25 for viewing television W information. The content model may be based on information about services or resources available from a server, such as product data, professional reviews, and consumer reviews. For example, even though the client-provided user data does not indicate that Joe has expressed any interest in television W information, the televisions4u.com website's server 206 uses the first content model 218 to generate the score of 25 for viewing television W information because the first content model 218 identifies the feature of 4k resolution offered by each of the televisions X, Y, and Z, for which the user data indicates Joe has expressed an interest, and television W also offers the feature of 4k resolution.

A server can be a host computer that runs computer programs which share their resources or services with clients. A server user can be a person who operates a computer to request a resource or a service. A cross-user model can be a learned knowledge that enables prediction of behavior by a person operating a computer, such as a client, based on previous behavior by multiple people who operated multiple computers. A server customized action can be a behavior that is modified, by the host computer that runs computer programs which share their resources or services with clients, in order to suit the person who is using the client. A server score can be a rating or grade that is generated by the host computer that runs computer programs which share their resources or services with clients.

Upon receiving the server scores from the server, the client generates hybrid scores corresponding to hybrid customized actions by combining the client scores with the server scores, block 106. The client generates client-server hybrid scores for hybrid customized actions by combining client scores with server scores. In embodiments, this can include the smartphone 202 receiving the server scores from the televisions4u.com website server 206, and combining the scores based on Joe's history with the scores based on the website users' histories to generate hybrid scores of 85 for viewing television X information, 50 for viewing television Y information, and 65 for viewing television Z information. Although this example describes the client combining the client scores based on the user-specific model with the server scores based on the cross-user model, the server scores may be based on both the cross-user model and the server content model. While this example describes the client combining the client scores with the server scores by adding the client scores to the server scores, the client may use more advanced forms of combining scores, such as weighting one type of score higher than another, and/or probabilistic combining based on multiplying scores instead of adding scores.

Combining the client scores with the server scores may be based on a client weight assigned to the client scores and a server weight assigned to the server scores, the client weight being different from the server weight. The client weight may be based on a count of any historical user actions associated with the action, a temporal proximity of any historical user action associated with the action, and/or an association between a historical hybrid customized action and a historical user action subsequent to the historical hybrid customized action. For example, the smartphone 202 assigns a weight of 99 to the client scores and a weight of 1 to the server scores, which results in the hybrid scores being based almost entirely on the client scores, because the smartphone 202's user-specific model 212 has a recent history of predicting which television Joe will purchase significantly more accurately than predicted by the first server 206's cross-user model 216. In another example, the laptop computer 204 assigns a weight of 0 to the client scores and a weight of 1 to the server scores, which results in the hybrid scores being based entirely on the server scores, because the user Ann is a new user who has no history of viewing of searching for television information.

A hybrid customized action can be a behavior that is collectively modified by a server and a client in order to suit the person who is using the client. A historical hybrid customized action can be a previous behavior that was collectively modified by a server and a client in order to suit the person who was using the client. A hybrid score can be a rating or grade that is collectively generated by a server and a client. A client weight can be a factor assigned, by a part of computer hardware or software that accesses a service or resource made available by a server, to one of a set of numerical quantities, used to represent its importance relative to the other members of the set. A server weight can be a factor assigned, by a host computer that runs computer programs which share their resources or services with clients, to one of a set of numerical quantities, used to represent its importance relative to the other members of the set. A historical user action can be previous behavior by a person who operated a computer, such a previous occasion when a user operated a client to request a service or a resource from a server.

Following the generation of the hybrid scores, the client causes the hybrid customized actions to be outputted based on the corresponding hybrid scores, block 108. For example and without limitation, this can include the smartphone 202 outputting televisions4u.com's webpage to Joe, displaying television X information prominently at the top due to its highest hybrid score of 85, followed by television Z information due to its hybrid score of 65, with a scroll down required to view television Y information due to its lowest hybrid score of 50. The smartphone 202 displayed television X information prominently at the top of the webpage due to the scores based on Joe's history, which were not available to the televisions4u.com website's server 206 because Joe was a first time visitor to the website, but did not display television Y information next because of the scores based on the website users' histories. Even though television Y information had the second highest score based on Joe's history and the second highest score based on the website users' histories, the smartphone 202 did not display television Y information as either of the top two televisions, as the webpage required scrolling to view television Y information due to its third-highest hybrid score. Although these examples describe outputting the hybrid customized actions as search results, the client can output any type of hybrid customized actions. For example, the smartphone 202 outputs an advertisement for television X at the top of the webpage for the televisions4u.com website. In another example, the smartphone 202 outputs a message recommending the purchase of television X when or after Joe visits the televisions4u.com website.

Periodically, the client optionally sends the user-specific model to the server, thereby enabling the server to modify the cross-user model based on the user-specific model, block 110. The client can enable the server to update the cross-user model based on the most recent user-specific model. By way of example and without limitation, this can include the smartphone 202 sending the first user-specific model 212 for Joe's viewing of television information to the first server 206 for the website televisions4u.com, which uses the first user-specific model 212 for Joe's viewing of television information to update the televisions4u.com website server 206's cross-user model 216. If the volume of user actions that impact the user-specific model has increased significantly, but the nature of these user actions has not changed, then the characteristics of the user-specific model have not changed. However, if a user has qualitatively changed his behavior, such as by performing types of actions that the user had not performed previously, then the training of the user-specific model has changed the characteristics of the user-specific model. The client can detect the changed characteristics of the user-specific model, and send the changed user-specific model to the server to enable the updating of the cross-user model.

Occasionally, the client optionally modifies the user-specific model based on the cross-user model, in response to receiving the cross-user model from the server, block 112. The client can base the user-specific model for a contextually new user on the server's cross-user model. In embodiments, this can include the second server 208 for the books4u.com website sending its cross-user model 220 to Joe's smartphone 202 when Joe visits the books4u.com website, and Joe's smartphone 202 basing its user-specific model 212 on the second cross-user model 220 because Joe has no history of visiting book sales websites. Similar to the detection of qualitative changes in the user-specific model, a server can detect qualitative changes in a cross-user model. Generally, qualitative changes in the cross-user model occur due to a new trend, such as when a whole segment of users begin behaving differently. For example, user interactions with a website change qualitatively in response to an enhancement to the website that adds new actions or improves the placement of existing actions. In response to such qualitative changes to a cross-user model, a server can send the changed cross-user model to a client that is visiting the server's website.

Likewise, the server can detect qualitative changes in the content model, such as when a website adds a new product and the content model can confidently predict that the new product will generate significant sales. In response to such qualitative changes to a content model, a server can send the changed content model to a client that is visiting the server's website. For example, the first server 206 detects qualitative changes in the first content model 218 when the televisions4u.com website adds the new product television W, which offers the feature of 4k resolution offered by each of the frequently sold televisions X, Y, and Z, and sends the changed first content model 218 to Joe's smartphone 202 that is visiting the televisions4u.com website. A backend server can regenerate the resources for the updated cross-user models and server content models, and the website servers can periodically fetch the updated models if their cache expiration is kept relatively small, such as 24 hours.

The method 100 may be repeated as desired. Although this disclosure describes the blocks 102-112 executing in a particular order, the blocks 102-112 may be executed in a different order. In other implementations, each of the blocks 102-112 may also be executed in combination with other blocks and/or some blocks may be divided into a different set of blocks.

FIG. 2 depicts an example system 200 for client-server hybrid A.I. scores for customized actions, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a computing system that includes a first client 202, a second client 204, a first server 206, and a second server 208. Although FIG. 2 depicts the first client 202 as a smartphone 202 and the second client 204 as a laptop computer 204, the clients 202-204 may be any type of clients 202-204. The clients 202-204 and the servers 206-208 communicate via a network 210. The first client 202 includes a first user-specific client model 212, the second client 204 includes a second user-specific client model 214, the first server 206 includes a first cross-user model 216 and a first content model 218, and the second server 208 includes a second cross-user model 220 and a second content model 222.

As an example of the functioning of the system 200, Joe uses his smartphone 202 to view the televisions4u.com website, and the smartphone 202 uses the first user-specific model 212 that projects trends in user Joe's viewing history to generate scores of 70 for viewing television X information, 20 for viewing television Y information, and 10 for viewing television Z information. Then the smartphone 202 requests the website's server 206 to use the first cross-user model 216 that projects trends in the website users' viewing and purchasing histories to provide scores, which generates scores of 15 for viewing television X information, 30 for viewing television Y information, and 55 for viewing television Z information. Next, the smartphone 202 receives the server scores from the televisions4u.com website server 206, and combines the scores based on Joe's history with the scores based on the website users' histories to generate hybrid scores of 85 for viewing television X information, 50 for viewing television Y information, and 65 for viewing television Z information. Finally, the smartphone 202 outputs televisions4u.com's webpage to Joe, displaying television X information prominently at the top due to its highest hybrid score of 85, followed by television Z information due to its hybrid score of 65, with a scroll down required to view television Y information due to its lowest hybrid score of 50.

Although FIG. 2 depicts the system 200 with two clients 202-204, two servers 206-208, one network 210, two user-specific client models 212-214, two cross-user models 216 and 220, and two content models 218 and 222, the system 200 may include any number of clients 202-204, any number of servers 206-208, any number of networks 210, any number of user-specific client models 212-214, any number of cross-user models 216 and 220, and any number of content models 218 and 222. The clients 202-204 and the servers 206-208 may each be substantially similar to the hardware device 300 depicted in FIG. 3 and described below.

System Overview

Figure 3:
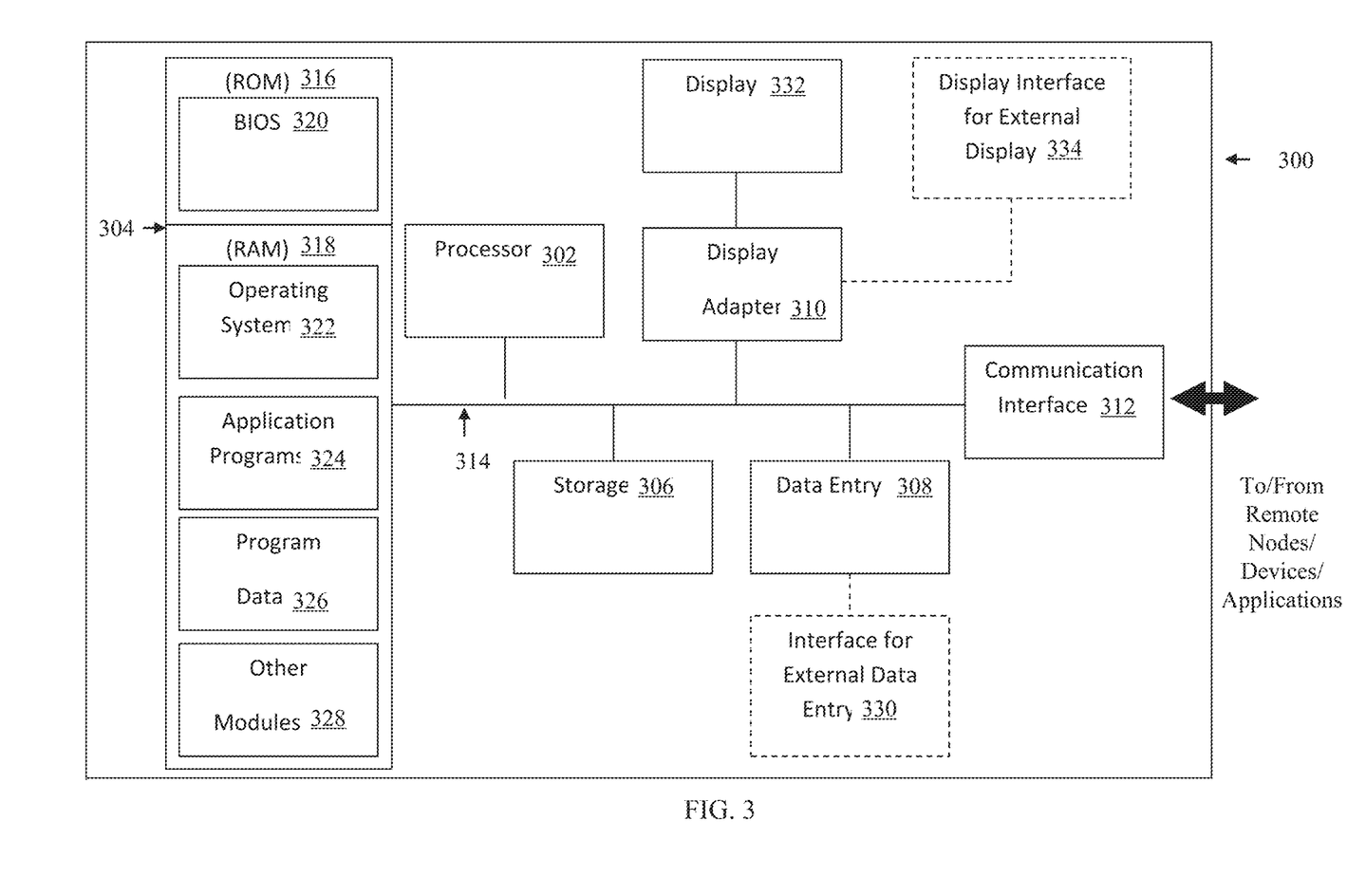
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
generate, by a client computing system, a plurality of client scores corresponding to a plurality of client customized actions by applying a user-specific model residing on the client computing system to an action received from a user, the user-specific model being based on at least one historical action received from the user, the user-specific model including modifications based upon a cross-user model received from a server, the cross-user model being based on a plurality of historical actions associated with a plurality of server users and including changes in the cross-user model that establish a new trend detected by the server prior to sending the cross-user model to the client computing system;
request, by the client computing system, the server to provide a plurality of server scores corresponding to a plurality of server customized actions by applying the cross-user model to the action received from the user;

combine, by the client computing system, the plurality of client scores with the plurality of server scores received from the server to generate a plurality of hybrid scores corresponding to a plurality of hybrid customized actions, the plurality of hybrid scores being different than the pluralities of client and server scores; and cause, by the client computing system, the plurality of hybrid customized actions to be outputted based on the plurality of corresponding hybrid scores.

2. The system of claim 1, wherein requesting the server to provide the plurality of server scores comprises providing the server with data associated with the user.

3. The system of claim 1, wherein the plurality of server scores are further based on applying a content model to the action from the user, the content model based on data associated with server content.

4. The system of claim 1, wherein combining the plurality of client scores with the plurality of server scores is based on a client weight assigned to the plurality of client scores and a server weight assigned to the plurality of server scores, the client weight being different from the server weight, and the client weight being based on at least one of a count of any historical user actions associated with the action and a temporal proximity of any historical user action associated with the action.

5. The system of claim 4, wherein the client weight is further based on an association between a historical hybrid customized action and a historical user action subsequent to the historical hybrid customized action.

6. The system of claim 1, comprising further instructions, which when executed, cause the one or more processors to send, by the client, the user-specific model to the server, thereby enabling the server to modify the cross-user model based on the user-specific model.

7. A computer program product comprising a non-transitory computer readable medium storing computer-readable program code to be executed by one or more processors, the program code including instructions to:

generate, by a client computing system, a plurality of client scores corresponding to a plurality of client customized actions by applying a user-specific model residing on the client computing system to an action received from a user, the user-specific model being based on at least one historical action received from the user, the user-specific model including modifications based upon a cross-user model received from a server, the cross-user model being based on a plurality of historical actions associated with a plurality of server users and including changes in the cross-user model that establish a new trend detected by the server prior to sending the cross-user model to the client computing system;

request, by the client computing system, the server to provide a plurality of server scores corresponding to a plurality of server customized actions by applying the cross-user model to the action received from the user;

combine, by the client computing system, the plurality of client scores with the plurality of server scores received from the server to generate a plurality of hybrid scores corresponding to a plurality of hybrid customized actions, the plurality of hybrid scores being different than the pluralities of client and server scores; and cause, by the client computing system, the plurality of hybrid customized actions to be outputted based on the plurality of corresponding hybrid scores.

8. The computer program product of claim 7, wherein requesting the server to provide the plurality of server scores comprises providing the server with data associated with the user.

9. The computer program product of claim 7, wherein the plurality of server scores are further based on applying a content model to the action from the user, the content model based on data associated with server content.

10. The computer program product of claim 7, wherein combining the plurality of client scores with the plurality of server scores is based on a client weight assigned to the plurality of client scores and a server weight assigned to the plurality of server scores, the client weight being different from the server weight, and the client weight being based on at least one of a count of any historical user actions associated with the action and a temporal proximity of any historical user action associated with the action.

11. The computer program product of claim 10, wherein the client weight is further based on an association between a historical hybrid customized action and a historical user action subsequent to the historical hybrid customized action.

12. The computer program product of claim 7, wherein the program code comprises further instructions to send, by the client, the user-specific model to the server, thereby enabling the server to modify the cross-user model based on the user-specific model.

13. A method comprising:

generating, by a client computing system, a plurality of client scores corresponding to a plurality of client customized actions by applying a user-specific model residing on the client computing system to an action received from a user, the user-specific model being based on at least one historical action received from the user, the user-specific model including modifications based upon a cross-user model received from a server, the cross-user model being based on a plurality of historical actions associated with a plurality of server users and including changes in the cross-user model that establish a new trend detected by the server prior to sending the cross-user model to the client computing system;

requesting, by the client computing system, the server to provide a plurality of server scores corresponding to a plurality of server customized actions by applying the cross-user model to the action received from the user;

combining, by the client computing system, the plurality of client scores with the plurality of server scores received from the server to generate a plurality of hybrid scores corresponding to a plurality of hybrid customized actions, the plurality of hybrid scores being different than the pluralities of client and server scores; and causing, by the client computing system, the plurality of hybrid customized actions to be outputted based on the plurality of corresponding hybrid scores.

14. The method of claim 13, wherein requesting the server to provide the plurality of server scores comprises providing the server with data associated with the user.

15. The method of claim 13, wherein the plurality of server scores are further based on applying a content model to the action from the user, the content model based on data associated with server content.

16. The method of claim 13, wherein combining the plurality of client scores with the plurality of server scores comprises is based on a client weight assigned to the plurality of client scores and a server weight assigned to the plurality of server scores, the client weight being different from the server weight, the client weight being based on at least one of a count of any historical user actions associated with the action, a temporal proximity of any historical user action associated with the action, and an association between a historical hybrid customized action and a historical user action subsequent to the historical hybrid customized action.

17. The method of claim 13, wherein the method further comprises sending, by the client, the user-specific model to the server, thereby enabling the server to modify the cross-user model based on the user-specific model.

\* \* \* \* \*